US012652384B2

(12) United States Patent
Naser et al.

(10) Patent No.: US 12,652,384 B2
(45) Date of Patent: Jun. 9, 2026

(54) INTRA MODE DERIVATION FOR INTER-PREDICTED CODING UNITS

(71) Applicant: INTERDIGITAL CE PATENT HOLDINGS, SAS, Paris (FR)

(72) Inventors: Karam Naser, Mouazé (FR); Franck Galpin, Thorigne-Fouillard (FR); Tangi Poirier, Thorigné-Fouillard (FR); Kevin Reuze, Rennes (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 18/853,589

(22) PCT Filed: Mar. 22, 2023

(86) PCT No.: PCT/EP2023/057364

§ 371 (c)(1),
(2) Date: Oct. 2, 2024

(87) PCT Pub. No.: WO2023/194105

PCT Pub. Date: Oct. 12, 2023

(65) Prior Publication Data

US 2025/0227222 A1      Jul. 10, 2025

(30) Foreign Application Priority Data

Apr. 7, 2022     (EP) ..................................... 22305483

(51) Int. Cl.
*H04N 19/105*          (2014.01)
*H04N 19/11*          (2014.01)
*H04N 19/176*          (2014.01)
(52) U.S. Cl.
CPC ........... *H04N 19/105* (2014.11); *H04N 19/11* (2014.11); *H04N 19/176* (2014.11)

(58) Field of Classification Search
CPC .... H04N 19/105; H04N 19/11; H04N 19/176; H04N 19/137; H04N 19/593; H04N 19/119; H04N 19/159
See application file for complete search history.

(56) References Cited

U.S. PATENT DOCUMENTS

2010/0142622 A1      6/2010   Le Leannec et al.
2017/0214932 A1      7/2017   Huang
(Continued)

FOREIGN PATENT DOCUMENTS

EP            3764644            1/2021
WO         2014205339         12/2014

OTHER PUBLICATIONS

Jang et al., EE2-Related: Intra Mode Derivation Based on TIMD for GPM Inter/Intra, 24, JVET Meeting, (The Joint Video Exploration Team of ISO/IEC JTC1/SC29/WG11 and ITU-T SG.16, No. JVET-x0147, m57948, Oct. 11, 2021.
(Continued)

*Primary Examiner* — Jared Walker
(74) *Attorney, Agent, or Firm* — Ronald Kolczynski

(57)          ABSTRACT

Intra prediction modes are determined for entry in most probable mode lists for encoding in video encoders and decoding in video decoders. In at least one embodiment, coding modes are derived to determine reference samples to use from inter coded neighboring blocks. In one embodiment, up to five neighboring blocks are used. The reference samples are used in an intra prediction mode to determined prediction samples. The reference samples are used for prediction in encoding or decoding. In at least one embodiment, one of several motion models can be used to extract the intra motion mode. The intra motion modes are used to (Continued)

0: Planar
1: DC fill a most probable mode list. The motion model, intra mode, or reference frame can be signaled from an encoder to a decoder.

19 Claims, 10 Drawing Sheets

(56) References Cited

U.S. PATENT DOCUMENTS

| | | | |
|---|---|---|---|
| 2018/0376164 A1 | 12/2018 | Zhang et al. | |
| 2019/0215521 A1* | 7/2019 | Chuang | H04N 19/105 |
| 2019/0281290 A1 | 9/2019 | Lee et al. | |
| 2021/0076029 A1* | 3/2021 | Han | H04N 19/176 |
| 2021/0092356 A1* | 3/2021 | Li | H04N 19/176 |
| 2021/0297658 A1 | 9/2021 | Lee et al. | |
| 2022/0166973 A1* | 5/2022 | Kang | H04N 19/176 |
| 2022/0312030 A1* | 9/2022 | Zhang | H04N 19/105 |
| 2022/0329800 A1* | 10/2022 | Ray | H04N 19/176 |
| 2022/0417511 A1* | 12/2022 | Li | H04N 19/159 |
| 2023/0049154 A1* | 2/2023 | Li | H04N 19/136 |
| 2023/0114696 A1* | 4/2023 | Li | H04N 19/132 |

OTHER PUBLICATIONS

Coban et al., Algorithm description of Enhanced Compression Model 2 (ECM 2), document JVET-W2025 23rd JVET Meeting, by teleconference, Jul. 7-16, 2021.

Series H: Audiovisual and Multimedia Systems Infrastructure of Audiovisual Services—Coding of Moving Video, Versatile Video Coding (VVC), ITU-T H.266 (ex H.VVC) | ISO/IEC 23090-3, Aug. 2020.

Coban et al., "Algorithm Description of Enhanced Compression Model 3 (ECM 3)", The Joint Video Exploration Team of ISO/IEC JTC1/SC29/WG11 and ITU-T SG.16, Document: JVET-X2025, 23rd Meeting, by teleconference, Jul. 7, 2021, 28 pages.

Zhang et al., Intra-Prediction Mode Propagation for Video Coding, IEEE Journal on Emerging and Selected Topics in Circuits and Systems, vol. 9n No. 1, (Mar. 2019), pp. 110-121.

Chen, et al., EE2-Related: On Propagating Intra Prediction Mode for IBC, 24, JVET Meeting: Oct. 6, 2021-Oct. 15, 2021, Teleconference, (The Joint Video Exploration Team of ISO/IEC JTC1/SC29/WG11 and ITU-T SG.16, No. JVET-X0100, m57894, Oct. 8, 2021.

* cited by examiner

0: Planar
1: DC

[a]

|   |
|---|
| 0 |
| 1 |
| 2 |
| 3 |

[b]

500

Start —501

Deriving Intra Mode from One or More Neighboring Inter Coded Blocks — 510

Conditionally Adding Derived Intra Moding Modes to MPM List — 520

Encoding at Least a Portion of the Video Block — 530

600

Start — 601

Deriving Intra Mode from One or More Neighboring Inter Coded Blocks — 610

Conditionally Adding Derived Intra Moding Modes to MPM List — 620

Decoding at Least a Portion of the Video Block — 630

700

INTRA MODE DERIVATION FOR INTER-PREDICTED CODING UNITS

CROSS REFERENCE TO RELATED APPLICATIONS

This application is a U.S. National Stage Application under 35 U.S.C. 371 of International Patent Application No. PCT/EP2023/057364, filed Mar. 22, 2023, which is incorporated herein by reference in its entirety.

This application claims the benefit of European Application No. 22305483.4 filed Apr. 7, 2022, which is incorporated herein by reference in its entirety.

FIELD OF THE INVENTION

At least one of the present embodiments generally relates to a method or an apparatus for video encoding or decoding, compression, or decompression.

BACKGROUND

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY OF THE INVENTION

At least one of the present embodiments generally relates to a method or an apparatus for video encoding or decoding, and more particularly, to a method or an apparatus for improving the coding efficiency of decoder side intra mode derivation from surrounding reference pixels.

According to a first aspect, there is provided a method. The method comprises steps for deriving an intra coding mode from one or more inter coded neighboring blocks; conditionally adding the derived intra coding modes to a most probable mode list; and, encoding at least a portion of the video block using the most probable mode list.

According to a second aspect, there is provided another method. The method comprises steps for deriving an intra coding mode from one or more inter coded neighboring blocks; conditionally adding the derived intra coding modes to a most probable mode list; and, decoding at least a portion of the video block using the most probable mode list.

According to another aspect, there is provided an apparatus. The apparatus comprises a processor. The processor can be configured to encode a block of a video or decode data by executing any of the aforementioned methods.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of a video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

DETAILED DESCRIPTION

Figure 1:
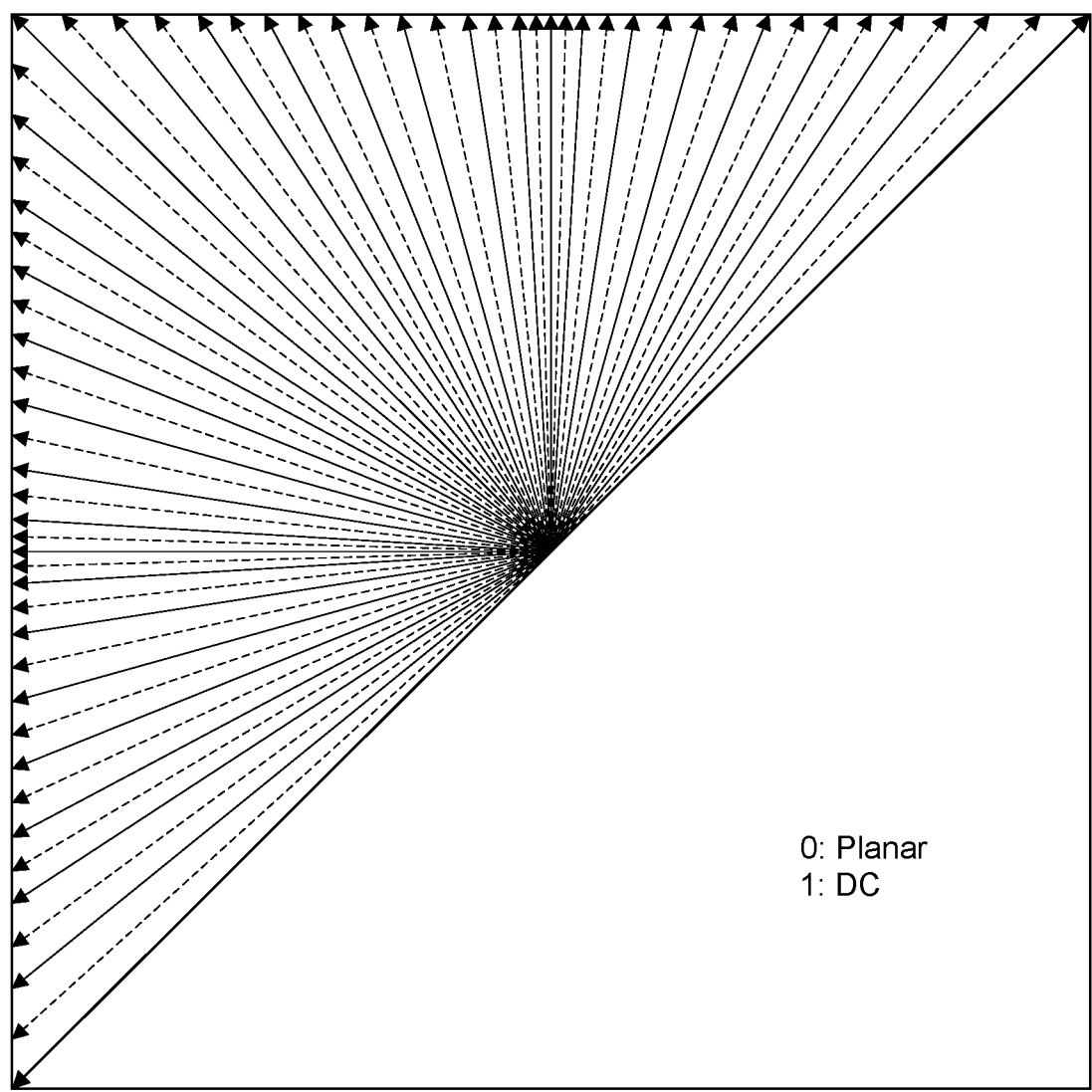
FIG. 1 illustrates the 67 intra prediction modes in VVC and ECM.
Figure 2:
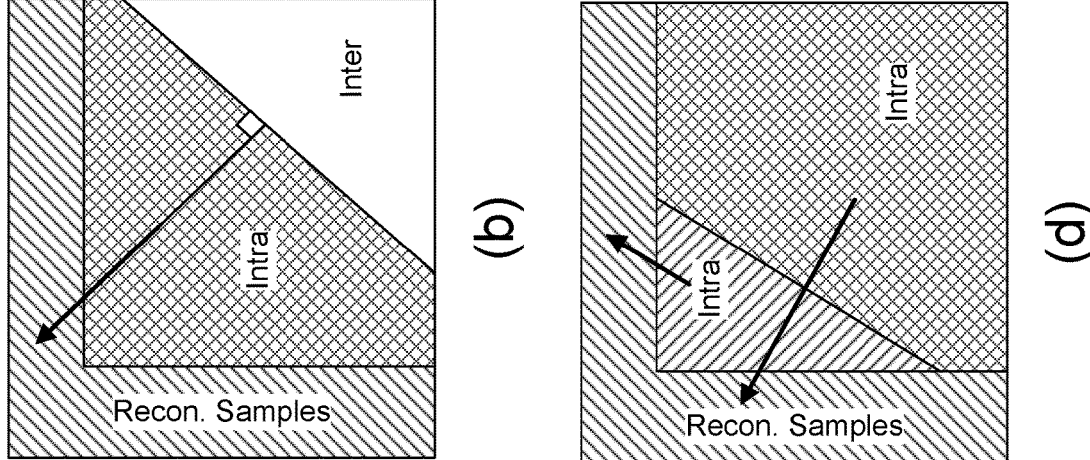
FIG. 2 illustrates in (a)-(c) examples of available IPM candidates and (d) example of GPM with inter and intra prediction.
Figure 2:
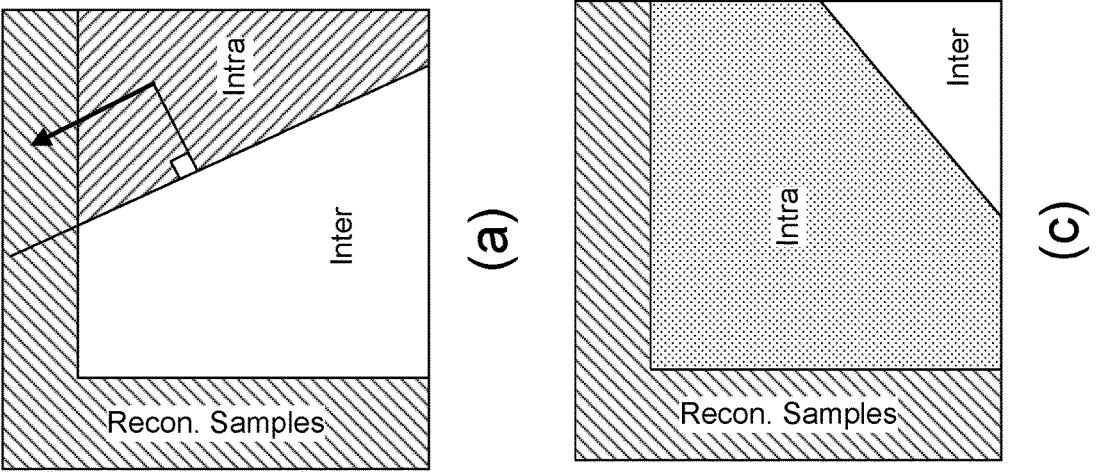

The intra prediction is a fundamental coding tool in video compression. The encoder selects the best prediction mode and signals its index to the decoder to perform the same prediction. Signaling the mode can add extra overhead and reduce the gain from intra part. Therefore, a smart way of coding the mode is to select a set of most probable modes and thus reduce the signaling overhead if the mode is within that list. This is a classical method for signaling the intra prediction mode, known as MPM list based signaling, which is employed in VVC and HEVC. This method is extended in ECM, where 2 MPM lists are used instead of one, where the first list contains 6 MPMs, and the second list contains another 16 MPMs.

In ECM, two additional intra prediction modes are introduced. The first is known as Decoder-side Intra Mode Derivation (DIMD) and the second is known as Template-based Intra Mode Derivation (TIMD). In both modes, the reconstructed pixels surrounding the current block on the top and left directions (template pixels) are used to derive the intra prediction modes. Specifically, in DIMD, the template of reconstructed pixels is analyzed to deduce the directionality of the template, from which two directional modes are selected. The prediction signal is generated from blending those two modes with planar mode. In TIMD, on the other hand, intra prediction modes are tested on the template of reconstructed pixels and the two best modes are selected (those which minimize the Sum of Absolute Transform Difference (SATD) between the template of reconstructed pixels and its prediction). The prediction signal is generated from blending those two modes. In non-I-slices (B- or P-slices), it is possible that many of the intra coded blocks are surrounded by inter-coded blocks. This leads to deficiency in filling-in the MPM lists. This is because MPM lists are filled with the intra modes of the neighboring blocks. If a neighboring block is inter-coded, a process known as intra-mode propagation is used, where the intra mode of the reference block is used if it is intra coded. Otherwise, some default modes are used.

Recently in ECM, two modes combine both inter-intra modes. First, the combined inter-intra prediction (CIIP) and geometric partition mode (GPM). Specifically, CIIP derives an intra mode from its template pixels and combine that mode with inter part, and GPM uses similar intra derivation mode. This is different from the design of VVC, where CIIP uses only a predefined intra mode (planar) and GPM combines 2 inter modes, but not inter and intra mode.

The intra prediction mode readily available with GPM and can be used to fill in the MPM list instead of using the reference samples' mode. Similarly, the intra prediction mode derivation can be used to deduce the best intra prediction mode of the neighboring inter blocks so that it will be used in MPM list.

The main idea of the described aspects is to improve the MPM list construction by filling in with more accurate intra modes when the neighboring blocks are inter-coded.

Intra Mode Coding with 67 Intra Prediction Modes

To capture the arbitrary edge directions presented in natural video, the number of directional intra modes in VVC is extended from 33, as used in HEVC, to 65. The new directional modes not in HEVC are depicted as red dotted arrows in FIG. 12, and the planar and DC modes remain the same. These denser directional intra prediction modes apply for all block sizes and for both luma and chroma intra predictions.

In VVC, several conventional angular intra prediction modes are adaptively replaced with wide-angle intra prediction modes for the non-square blocks. Wide angle intra prediction is described elsewhere in this description.

In HEVC, every intra-coded block has a square shape and the length of each of its side is a power of 2. Thus, no division operations are required to generate an intra-predictor using DC mode. In VVC, blocks can have a rectangular shape that necessitates the use of a division operation per block in the general case. To avoid division operations for DC prediction, only the longer side is used to compute the average for non-square blocks.

To keep the complexity of the most probable mode (MPM) list generation low, an intra mode coding method with 6 MPMs is used by considering two available neighboring intra modes. The following three aspects are considered to construct the MPM list:

Default intra modes
Neighbouring intra modes
Derived intra modes

A unified 6-MPM list is used for intra blocks irrespective of whether MRL and ISP coding tools are applied or not. The MPM list is constructed based on intra modes of the left and above neighboring block. Suppose the mode of the left is denoted as Left and the mode of the above block is denoted as Above, the unified MPM list is constructed as follows:

When a neighboring block is not available, its intra mode is set to Planar by default.

If both modes Left and Above are non-angular modes:
MPM list→{Planar, DC, V, H, V−4, V+4}

If one of modes Left and Above is angular mode, and the other is non-angular:
Set a mode Max as the larger mode in Left and Above
MPM list→ {Planar, Max, Max−1, Max+1, Max−2, Max+2}

If Left and Above are both angular and they are different:
Set a mode Max as the larger mode in Left and Above
Set a mode Min as the smaller mode in Left and Above
If Max−Min is equal to 1:
MPM list→{Planar, Left, Above, Min−1, Max+1, Min−2}
Otherwise, if Max-Min is greater than or equal to 62:
MPM list→{Planar, Left, Above, Min+1, Max−1, Min+2}
Otherwise, if Max-Min is equal to 2:
MPM list→{Planar, Left, Above, Min+1, Min−1, Max+1}
Otherwise:
MPM list→{Planar, Left, Above, Min−1, −Min+1, Max-1}

If Left and Above are both angular and they are the same:
MPM list→{Planar, Left, Left−1, Left+1, Left−2, Left+2}

Besides, the first bin of the MPM index codeword is CABAC context coded. In total three contexts are used, corresponding to whether the current intra block is MRL enabled, ISP enabled, or a normal intra block.

During the 6 MPM list generation process, pruning is used to remove duplicated modes so that only unique modes can be included into the MPM list. For entropy coding of the 61 non-MPM modes, a Truncated Binary Code (TBC) is used.

Decoder Side Intra Mode Derivation (DIMD)

When DIMD is applied, two intra modes are derived from the reconstructed neighbor samples, and those two predictors are combined with the planar mode predictor with the weights derived from the gradients as described in JVET-00449. The division operations in weight derivation are performed utilizing the same lookup table (LUT) based integerization scheme used by the CCLM. For example, the division operation in the orientation calculation $$\text{Orient} = G_y/G_x$$

is computed by the following LUT-based scheme:
x=Floor(Log 2(Gx))
normDiff=((Gx<<4)>>x) & 15
x+=(3+ (normDiff!=0)?1:0)
Orient=(Gy*(DivSigTable[normDiff]|8)+ (1<<(x−1)))>>x
where
DivSigTable [16]={0, 7, 6, 5, 5, 4, 4, 3, 3, 2, 2, 1, 1, 1, 1, 0}.

Derived intra modes are included into the primary list of intra most probable modes (MPM), so the DIMD process is performed before the MPM list is constructed. The primary derived intra mode of a DIMD block is stored with a block and is used for MPM list construction of the neighboring blocks.

Fusion for Template-Based Intra Mode Derivation

For each intra prediction mode in MPMs, The SATD between the prediction and reconstruction samples of the template is calculated. First two intra prediction modes with the minimum SATD are selected as the TIMD modes. These two TIMD modes are fused with the weights after applying PDPC process, and such weighted intra prediction is used to code the current CU. Position dependent intra prediction combination (PDPC) is included in the derivation of the TIMD modes.

The costs of the two selected modes are compared with a threshold, in the test the cost factor of 2 is applied as follows:

$$costMode2 < 2 * costMode1.$$

If this condition is true, the fusion is applied, otherwise the only mode1 is used.

Weights of the modes are computed from their SATD costs as follows:

$$weight1 = costMode2/(costMode1 + costMode2)$$

$$weight2 = 1 - weight1$$

The division operations are conducted using the same lookup table (LUT) based integerization scheme used by the CCLM.

GPM with Inter and Intra Prediction

In GPM with inter and intra prediction, the prediction samples are generated by weighting inter predicted samples and intra predicted samples for each GPM-separated region. The inter predicted samples are derived by the same scheme as the GPM in the current ECM whereas the intra prediction mode is derived used DIMD process. GPM with intra and intra prediction as shown FIG. 1d is restricted in the proposed method to reduce the signalling overhead for IPMs and avoid an increase in the size of the intra prediction circuit on the hardware decoder. In addition, a direct motion vector and IPM storage on the GPM-blending area is introduced to further improve the coding performance.

CIIP in ECM

In CIIP mode, the prediction samples are generated by weighting an inter prediction signal predicted using CIIP-TM merge candidate and an intra prediction signal predicted using TIMD derived intra prediction mode. The method is only applied to coding blocks with an area less than or equal to 1024.

Figure 3:
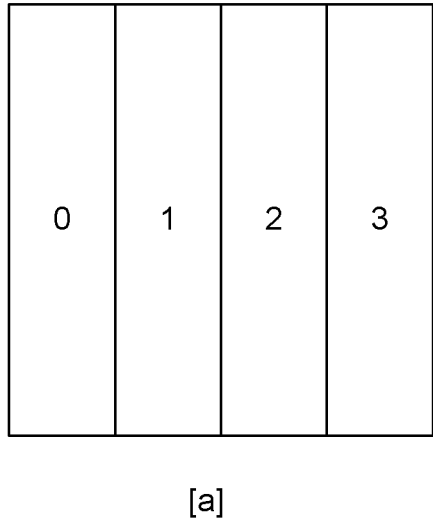
FIG. 3 illustrates a division method for angular modes.

The TIMD derivation method is used to derive the intra prediction mode in CIIP. Specifically, the intra prediction mode with the smallest SATD values in the TIMD mode list is selected and mapped to one of the 67 regular intra prediction modes. In addition, it is also proposed to modify the weights (wIntra, winter) for the two tests if the derived intra prediction mode is an angular mode. For near-horizontal modes (2<=angular mode index <34), the current block is vertically divided as shown in FIG. 3(a); for near-vertical modes (34<=angular mode index <=66), the current block is horizontally divided as shown in FIG. 3(b).

The (wIntra, winter) for different sub-blocks are shown in Table 1.

TABLE 1

| The modified weights used for angular modes. | |
| --- | --- |
| The sub-block index | (wintra, winter) |
| 0 | (6, 2) |
| 1 | (5, 3) |
| 2 | (3, 5) |
| 3 | (2, 6) |

With CIIP-TM, a CIIP-TM merge candidate list is built for the CIIP-TM mode. The merge candidates are refined by template matching. The CIIP-TM merge candidates are also reordered by the ARMC method as regular merge candidates. The maximum number of CIIP-TM merge candidates is equal to two.

Figure 4:
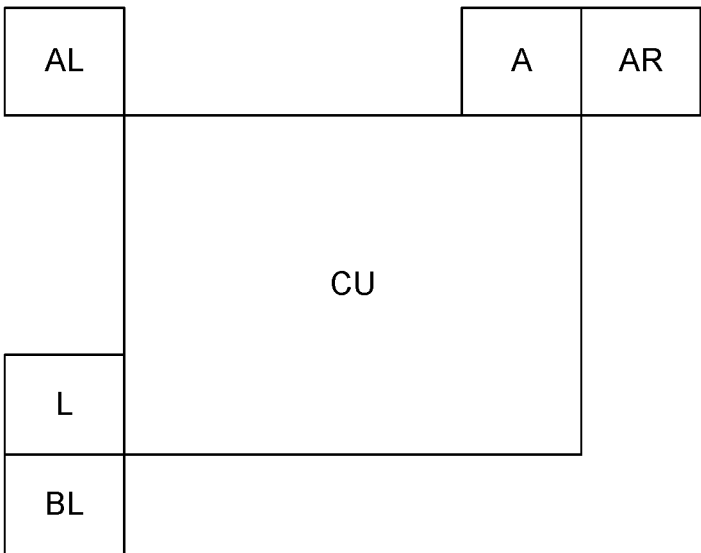
FIG. 4 illustrates an example of source of MPM intra modes from neighboring blocks.

The MPM lists are filled in with intra modes from the neighboring blocks. This is shown in the FIG. 4.

AL: above left

A: above

AR: Above right

L: left

BL: below left

These five neighbors are used by default for filling in an MPM list. If any of them is inter coded, the general aspects described propose different methods for deriving its intra mode. In the prior art, this case is treated by using the propagated intra mode.

In the case that any of the neighbors (AL, A, AR, L, BL) is inter coded, its intra mode is derived from its reference block. In the following embodiments, new methods are proposed to derive the intra mode of these blocks instead of using the current intra mode propagation method. The main advantage is that the derived intra mode is closer to the current mode and therefore MPM will be more efficient to code the current intra mode.

Embodiment 1: Using CIIP Intra Mode

If the neighboring block is coded with CIIP, its intra mode is available. It is proposed to use this mode to fill in the MPM instead of the propagated intra mode. It should be noted that this mode corresponds to TIMD mode, as TIMD is used for mode derivation in CIIP.

Embodiment 2: Using GPM Intra Mode

In GPM, there is a mode where intra and inter are combined. Similar to the previous embodiment, this mode can be used to fill in MPM instead of the propagated intra mode. It should be noted that this mode corresponds to DIMD mode, as DIMD is used for mode derivation in GPM.

Embodiment 3: Performing DIMD/TIMD to Derive the Best Prediction Mode

If the neighboring block is neither GPM (with intra) nor CIIP, the intra mode need to be derived. As seen in the previous embodiments, either TIMD (in CIIP) or DIMD (in GPM) is used to derive the current mode. Therefore, it is proposed to use any of them.

In other words, if the current neighboring block is not intra coded, DIMD or TIMD is used to derive its intra mode and this mode is used in MPM lists construction. It should be noted that this embodiment also considers the intra-block copy (IBC) mode. That is, if the neighboring block is IBC coded, TIMD or DIMD process is used to derive the best intra mode.

Embodiment 4: Testing all Possible Intra Mode on Reconstructed Inter Blocks

Instead of performing DIMD or TIMD, it is proposed to deduce the best intra prediction mode by testing all the intra modes on the reconstructed inter block surrounding the current block. That is, if one of the neighboring blocks is inter coded, and MPM is to be constructed, the intra mode corresponding to the inter block is derived as follows:

1—Generate the prediction signal from the available intra modes to the current considered inter block
2—Compute the distance between the predicted signal and the reconstructed signal of the considered inter block.
3—Select the mode with the minimum distance as the current intra mode of the considered inter block.

Figure 5:
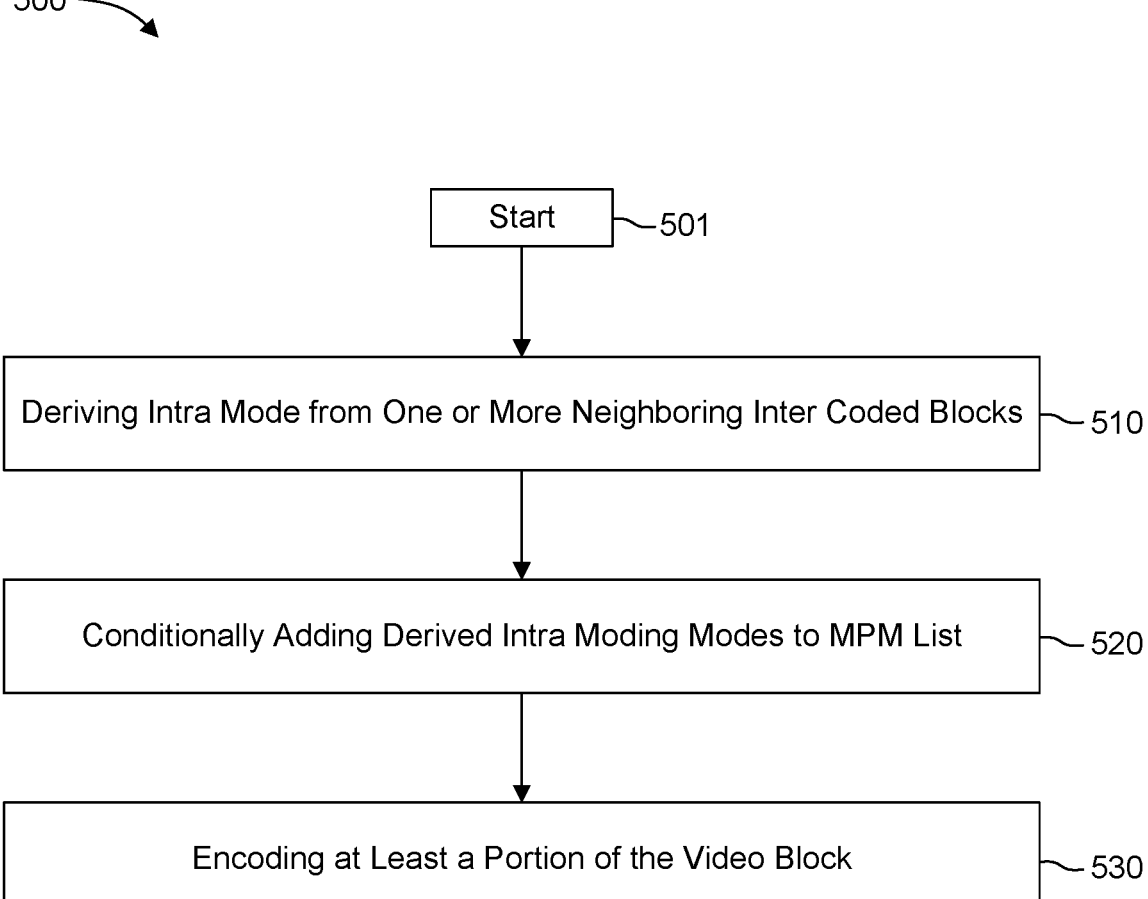
FIG. 5 illustrates one embodiment of a method for performing the described aspects.

One embodiment of a method 500 under the general aspects described here is shown in FIG. 5. The method commences at start block 501 and control proceeds to block 510 for deriving an intra coding mode from one or more inter coded neighboring blocks. Control proceeds from block 510 to block 520 for conditionally adding the derived intra coding modes to a most probable mode list. Control proceeds from block 520 to block 530 for encoding at least a portion of the video block using the most probable mode list.

Figure 6:
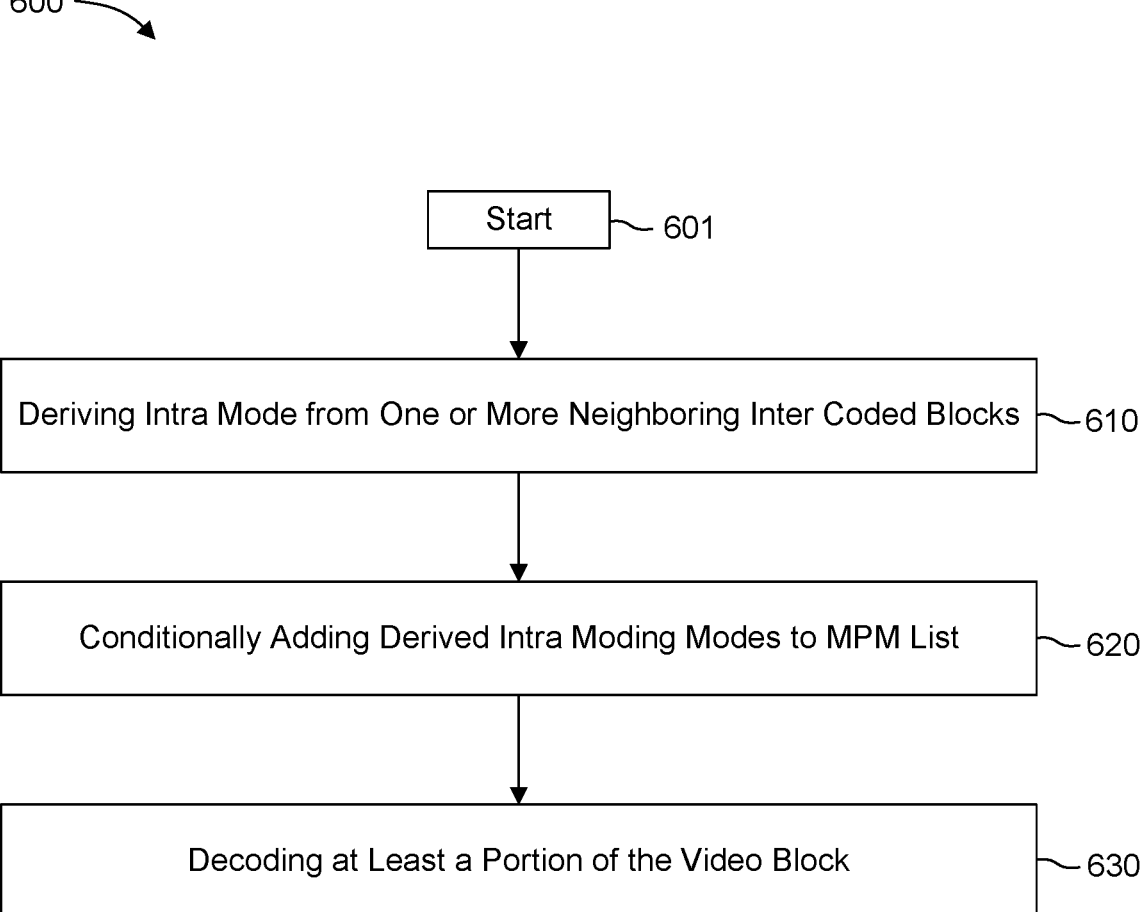
FIG. 6 illustrates an example of another embodiment of a method for performing the described aspects.

One embodiment of a method 600 under the general aspects described here is shown in FIG. 6. The method commences at start block 601 and control proceeds to block 610 for deriving an intra coding mode from one or more inter coded neighboring blocks. Control proceeds from block 610 to block 620 for conditionally adding the derived intra coding modes to a most probable mode list. Control proceeds from block 620 to block 630 for decoding at least a portion of the video block using the most probable mode list.

Figure 7:
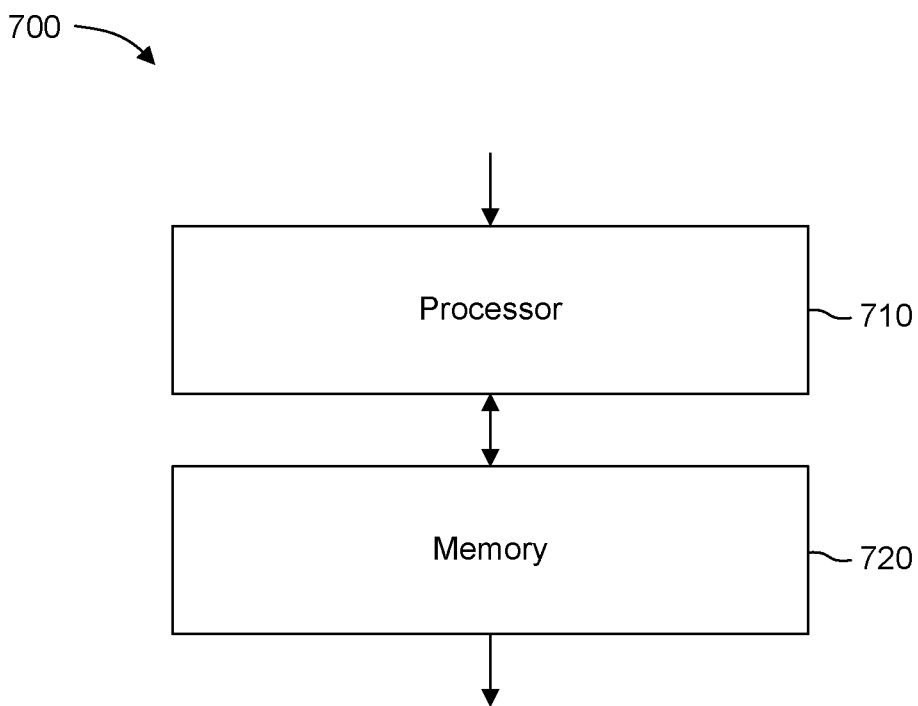
FIG. 7 illustrates an example of one embodiment of an apparatus for implementing the described aspects.

FIG. 7 shows one embodiment of an apparatus 700 for encoding, decoding, compressing, or decompressing video data using any of the above methods, or variations. The apparatus comprises Processor 710 and can be interconnected to a memory 720 through at least one port. Both Processor 710 and memory 720 can also have one or more additional interconnections to external connections.

Processor 710 is also configured to either insert or receive information in a bitstream and, either compressing, encoding, or decoding using any of the described aspects.

The embodiments described here include a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 8:
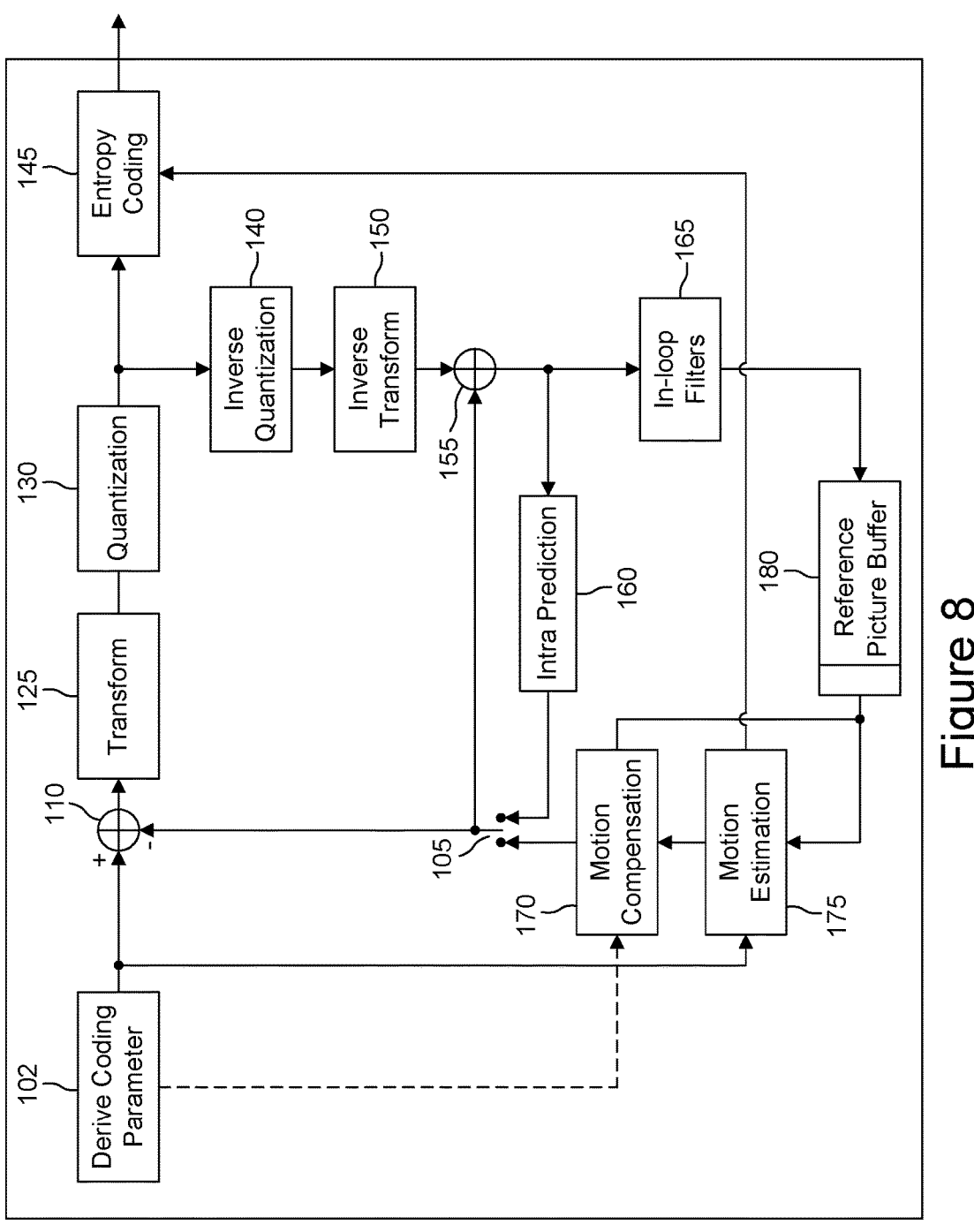
FIG. 8 illustrates an example of a generic video encoding or compression system.
Figure 9:
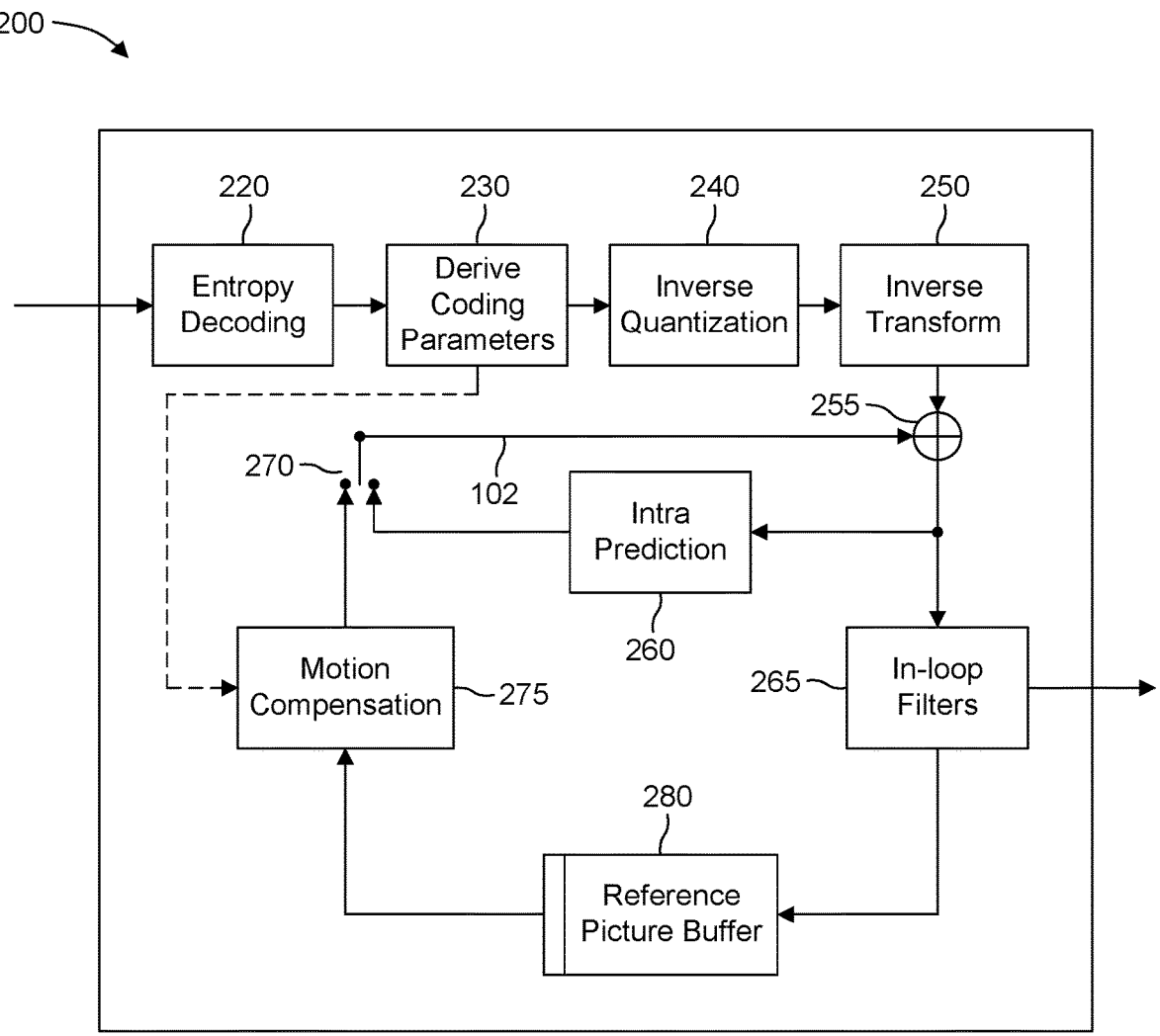
FIG. 9 illustrates an example of a generic video decoding or decompression system.
Figure 10:
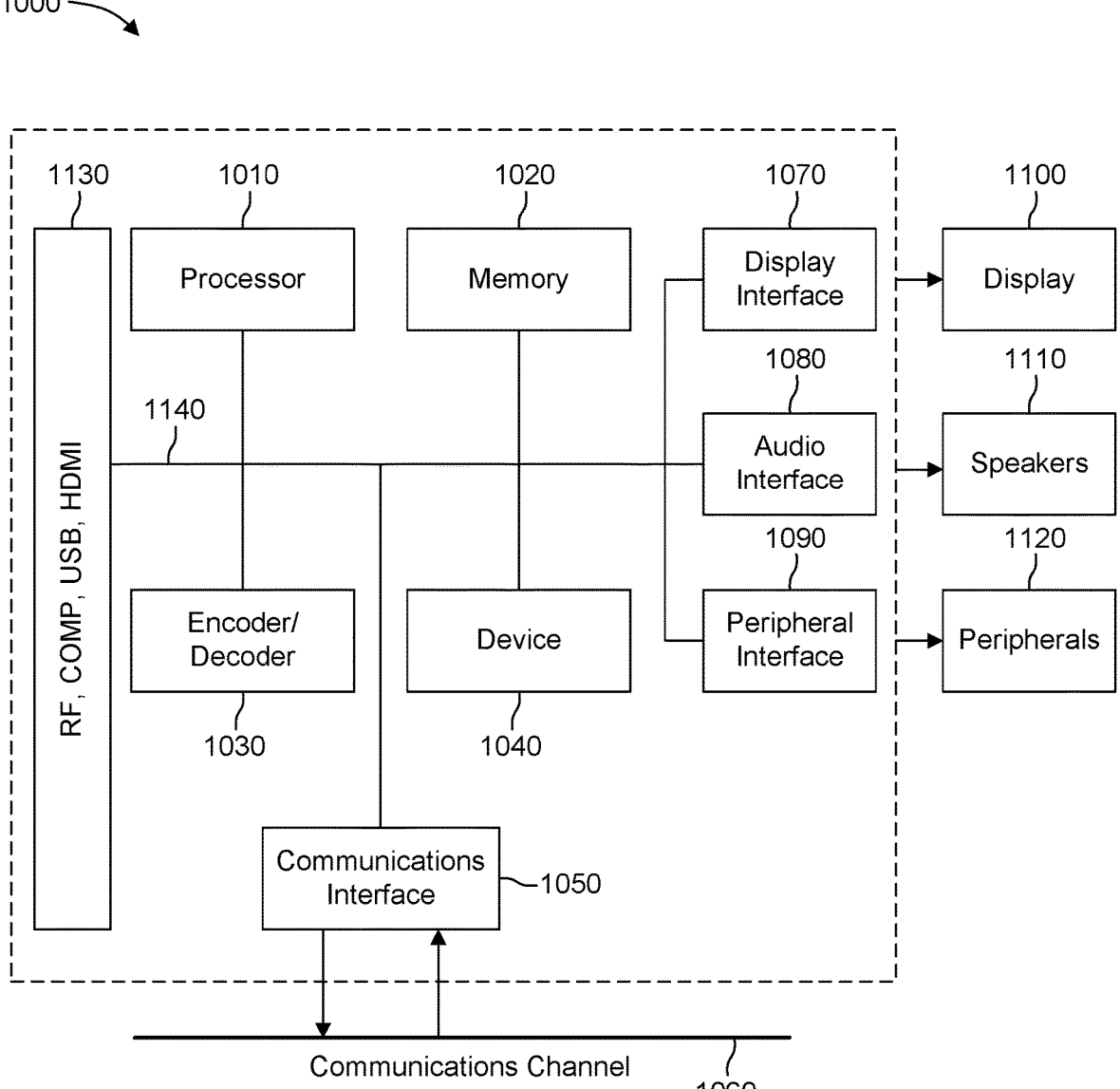
FIG. 10 illustrates an example of a processor-based system for implementing the described aspects.

The aspects described and contemplated in this application can be implemented in many different forms. FIGS. 8, 9, and 10 provide some embodiments, but other embodiments are contemplated and the discussion of FIGS. 8, 9, and 10 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the intra prediction, entropy coding, and/or decoding modules (160, 360, 145, 330), of a video encoder 100 and decoder 200 as shown in FIG. 8 and FIG. 9. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application. The specific values are for example purposes and the aspects described are not limited to these specific values.

FIG. 8 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset)/ALF (Adaptive Loop Filtering) filtering to reduce encoding artifacts. The filtered image is stored at a reference picture buffer (180).

FIG. 9 illustrates a block diagram of a video decoder 200. In the decoder 200, a bitstream is decoded by the decoder elements as described below. Video decoder 200 generally performs a decoding pass reciprocal to the encoding pass as described in FIG. 8. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g., conversion from YcbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 10 illustrates a block diagram of an example of a system in which various aspects and embodiments are implemented. System 1000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 10, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface Ics or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or another device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV. Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments may refer to parametric models or rate distortion optimization. In particular, during the encoding process, the balance or trade-off between the rate and distortion is usually considered, often given the constraints of computational complexity. It can be measured through a Rate Distortion Optimization (RDO) metric, or through Least Mean Square (LMS), Mean of Absolute Errors (MAE), or other such measurements. Rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of transforms, coding modes or flags. In this way, in an embodiment the same transform, parameter, or mode is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

The preceding sections describe a number of embodiments, across various claim categories and types. Features of these embodiments can be provided alone or in any combination. Further, embodiments can include one or more of the following features, devices, or aspects, alone or in any combination, across various claim categories and types:

One embodiment comprises predicting a video block using a most probable mode list comprising intra coding modes from neighboring inter coded blocks.

One embodiment comprises the above prediction wherein the intra coding modes are determined using a motion model One embodiment comprises the above method wherein an intra coding mode is determined using combined inter-intra prediction, geometric partitioning mode, template based intra mode derivation, or decoder side intra mode derivation.

One embodiment comprises the above method wherein motion models are used to determine a reference frame or a motion vector.

Some embodiments comprise any of the above methods wherein an index is signaled to indicate a motion model, reference frame, or motion vector to be used for encoding/decoding.

Some embodiments comprise any of the above methods using reference samples around a motion compensated block from a reference frame.

One embodiment comprises a bitstream or signal that includes one or more syntax elements to perform the above functions, or variations thereof.

One embodiment comprises a bitstream or signal that includes syntax conveying information generated according to any of the embodiments described.

One embodiment comprises creating and/or transmitting and/or receiving and/or decoding according to any of the embodiments described.

One embodiment comprises a method, process, apparatus, medium storing instructions, medium storing data, or signal according to any of the embodiments described.

One embodiment comprises inserting in the signaling syntax elements that enable the decoder to determine decoding information in a manner corresponding to that used by an encoder.

One embodiment comprises creating and/or transmitting and/or receiving and/or decoding a bitstream or signal that includes one or more of the described syntax elements, or variations thereof.

One embodiment comprises a TV, set-top box, cell phone, tablet, or other electronic device that performs transform method(s) according to any of the embodiments described.

One embodiment comprises a TV, set-top box, cell phone, tablet, or other electronic device that performs transform method(s) determination according to any of the embodiments described, and that displays (e.g. using a monitor, screen, or other type of display) a resulting image.

One embodiment comprises a TV, set-top box, cell phone, tablet, or other electronic device that selects, bandlimits, or tunes (e.g. using a tuner) a channel to receive a signal including an encoded image, and performs transform method(s) according to any of the embodiments described.

One embodiment comprises a TV, set-top box, cell phone, tablet, or other electronic device that receives (e.g. using an antenna) a signal over the air that includes an encoded image, and performs transform method(s).

The invention claimed is:

1. A method for encoding a video block, comprising:

deriving an intra coding mode using a template intra mode derivation process;

adding the derived intra coding mode to a most probable mode list when a current neighboring block is inter coded; and, encoding at least a portion of the video block using the most probable mode list wherein said derived intra coding mode is obtained from a neighboring block that uses combined inter-intra prediction coding mode, and when filling the most probable mode list, if the neighboring block is inter coded, use a derived intra mode using TIMD/DIMD process instead of a propagated intra mode.

2. An apparatus, comprising:

a processor, configured to perform:

deriving an intra coding mode using a template intra mode derivation process;

adding the derived intra coding mode to a most probable mode list when a current neighboring block is inter coded; and, encoding at least a portion of a video block using the most probable mode list wherein said derived intra coding mode is obtained from a neighboring block that uses combined inter-intra prediction coding mode, and when filling the most probable mode list, if the neighboring block is inter coded, use a derived intra mode using TIMD/DIMD process instead of a propagated intra mode.

3. A method, comprising:

deriving an intra coding mode using a template intra mode derivation process;

adding the derived intra coding mode to a most probable mode list when a current neighboring block is inter coded; and, decoding at least a portion of a video block using the most probable mode list wherein said derived intra coding mode is obtained from a neighboring block that uses combined inter-intra prediction coding mode, and when filling the most probable mode list, if the neighboring block is inter coded, use a derived intra mode using TIMD/DIMD process instead of a propagated intra mode.

4. An apparatus, comprising:

a processor, configured to perform:

deriving an intra coding mode using a template intra mode derivation process;

adding the derived intra coding mode to a most probable mode list when a current neighboring block is inter coded; and, decoding at least a portion of a video block using the most probable mode list wherein said derived intra coding mode is obtained from a neighboring block that uses combined inter-intra prediction coding mode, and when filling the most probable mode list, if the neighboring block is inter coded, use a derived intra mode using TIMD/DIMD process instead of a propagated intra mode.

5. The method of claim 1, wherein said derived intra coding mode is obtained from a neighboring block that uses combined inter-intra prediction coding mode.

6. The method of claim 1, wherein said derived intra coding mode is obtained from geometric partitioning mode where inter coding and intra coding are combined.

7. The method of claim 1, wherein said derived intra coding mode is obtained from template-based intra mode derivation.

8. The apparatus of claim 4 wherein, said derived intra coding mode is obtained from decoder side intra mode derivation.

9. The method or apparatus of claim 8, wherein a neighboring block is not intra coded.

10. The apparatus of claim 4, wherein said derived intra coding mode is obtained by testing intra modes on a reconstructed inter block surrounding the video block.

11. The apparatus of claim 10, wherein said derived intra coding mode is obtained by selecting a mode having minimum distance between a predicted signal and a reconstructed version of a considered inter block.

12. A device comprising:

an apparatus according to claim 4; and at least one of (i) an antenna configured to receive a signal, the signal including the video block, (ii) a band limiter configured to limit the received signal to a band of frequencies that includes the video block, and (iii) a display configured to display an output representative of the video block.

13. A non-transitory computer readable medium containing data content generated according to the method of claim 1, for playback using a processor.

14. The method of claim 3, wherein said derived intra coding mode is obtained from a neighboring block that uses combined inter-intra prediction coding mode.

15. The method of claim 3, wherein said derived intra coding mode is obtained from geometric partitioning mode where inter coding and intra coding are combined.

16. The method of claim 3, wherein said derived intra coding mode is obtained from template-based intra mode derivation.

17. The apparatus of claim 4, wherein, said derived intra coding mode is obtained from decoder side intra mode derivation.

18. The apparatus of claim 17, wherein a neighboring block is not intra coded.

19. The apparatus of claim 4, wherein said derived intra coding mode is obtained by testing intra modes on a reconstructed inter block surrounding the video block.

* * * * *